(12) United States Patent
Nagata et al.

(10) Patent No.: US 6,651,609 B2
(45) Date of Patent: Nov. 25, 2003

(54) NAGATA CYCLE ROTARY ENGINE

(76) Inventors: Sumiyuki Nagata, Nishi 3 sen, Minami 1 banchi, Naganwna-cho, Yubari-gun, Hokkaido (JP), 069-1473; Ryan W. Cobb, 2464 Pennylee Dr., Lima, OH (US) 45805

( * ) Notice: Subject to any disclaimer, the term of this patent is extended or adjusted under 35 U.S.C. 154(b) by 0 days.

(21) Appl. No.: 09/950,183

(22) Filed: Sep. 10, 2001

(65) Prior Publication Data

US 2003/0047158 A1 Mar. 13, 2003

(51) Int. Cl.7 .................................................. F02B 53/00
(52) U.S. Cl. ..................... 123/243; 123/44 R
(58) Field of Search ................. 123/241, 242, 123/243, 44 R, 44 D

(56) References Cited

U.S. PATENT DOCUMENTS

| 4,915,071 A | * | 4/1990 | Hansen ........................ 123/242 |
| 5,937,820 A | * | 8/1999 | Nagata et al. .............. 123/243 |

* cited by examiner

Primary Examiner—Hoang Nguyen

(57) ABSTRACT

An internal combustion rotary engine using vanes to create separate combustion chambers within the engine and capable of performing all four Otto cycles—intake, compression, combustion and exhaust—in each separate combustion chamber. Each Otto cycle is completed in a 180-degree rotation with all four Otto cycles being completed in 720 degrees. An intake and exhaust valve system tightly controls the flow of the air/fuel mixture into each separate combustion chamber.

7 Claims, 5 Drawing Sheets

NAGATA CYCLE ROTARY ENGINE

PRIOR WORK

This design is based on U.S. Pat. No. 5,937,820 (Aug. 17, 1999), the Four Cycle Rotary Engine. Nagata et al. The design created separate chamber rooms within the engine that were fed by an intake/exhaust system contained within the rotor. Each of the four Otto Cycles (intake, compression, combustion and exhaust) occurred in each separate chamber room in a 720-degree rotation of the rotor. The new design listed hereafter improves on this concept with fundamental design changes which we believe have not been anticipated by any previous art.

REFERENCES CITED

| DOCUMENT NO. | DATE | NAME | CLASSIFICATION |
| --- | --- | --- | --- |
| U.S. Pat. No. 5,937,820 | August 1999 | NAGATA ET AL. | 123/243 |
| U.S. Pat. No. 4,915,071 | April 1990 | HANSEN | 123/212 |

EXAMPLE 1

An internal combustion rotary engine consisting of housing (1) defining an oval or polygonal shaped housing inner wall (30) encasing an oval shaped or polygonal shaped rotor (2) positioned off-center of drive shaft (7), allowing it to displace the fuel/air mixture about the engine chamber. Eccentric shaft (21) transfers the motion of rotor (2) into drive shaft rotational energy. Vanes extending between rotor (2) and housing inner wall (30) create separate chamber rooms (23) within the engine and are supported on each end by either vane pivots (35) or pivoting vane slots (34), both located either in rotor (2) or housing (1). Each separate chamber room (23) has its own capability to accomplish the four Otto cycles—intake, compression, combustion and exhaust—in a 720-degree rotation of rotor (2). Each chamber room (23) also has its own method for combustion (8) as well as a set of intake valves (4) and exhaust valves (5) which draw in and expel the fuel/air mixture, respectively.

EXAMPLE 2

An internal combustion rotary engine consisting of a housing (1) defining a cylindrical chamber (30) encasing a cylindrical rotor (2) attached to drive shaft (7) being positioned off-center of the central axis of the inner chamber, allowing it to displace the fuel/air mixture about the engine chamber. Vanes (3) located in housing (1) create separate combustion chambers (23) within the engine. Each separate combustion chamber (23) has its own capability to accomplish the four Otto cycles—intake, compression, combustion and exhaust—in a 720-degree rotation of rotor (2). Each combustion chamber (23) also has its own method for combustion (8) as well as a set of intake valves (4) and exhaust valves (5) which draw in and expel the fuel/air mixture, respectively.

EXAMPLE 3

An internal combustion rotary engine consisting of a housing (1) defining a cylindrical chamber (30) encasing a cylindrical rotor (2) being positioned off-center of the central axis of the inner chamber, allowing it to displace the fuel/air mixture about the engine chamber. Eccentric shaft (21) transfers the motion of rotor (2) into drive shaft rotational energy. Vanes (3) located in housing (1) create separate combustion chambers (23) within the engine. Each separate combustion chamber (23) has its own capability to accomplish the four Otto cycles—intake, compression, combustion and exhaust—in a 720-degree rotation of rotor (2). Each combustion chamber (23) also has its own method for combustion (8) as well as a set of intake valves (4) and exhaust valves (5) which draw in and expel the fuel/air mixture, respectively.

EXAMPLE 4

An internal combustion rotary engine consisting of housing (14) defining a cylindrical chamber (30) encasing a cylindrical piston (15) being positioned off-center of the central axis of the housing inner chamber, allowing it to displace the fuel/air mixture about the engine. Housing (1) is attached to drive shaft (7). Piston (15) is immobile. Vanes (31) located in and arranged around piston (15) create separate combustion chambers (23) within the engine. Each separate combustion chamber (23) has its own capability to accomplish the four Otto cycles—intake, compression, combustion and exhaust—in a 720-degree rotation of housing (14). Each combustion chamber (23) also has its own method for combustion (8) as well as a set of intake valves (4) and exhaust valves (5) which draw in and expel the fuel/air mixture, respectively. Combustion causes housing (14) of the engine to rotate transferring rotational energy to driveshaft (7).

BACKGROUND OF THE INVENTION

1. Field of the Invention

This invention relates to rotary engines.

2. Description of the Prior Art

Since the invention of the rotary pump in 1588 by Ramelli, the concept of a properly functioning internal combustion rotary engine has been the "Holy Grail" of engine design. The only rotary engine to be mass-produced was the Wankel Rotary Engine. Even since it's first mass production in the 1970's, the rotary engine has not enjoyed widespread production or success.

The main advantage of the rotary engine is, as its name implies, rotational energy. Unlike the piston engine, a crankshaft and complex set of connecting rods are not needed to convert the up and down motion of a piston into rotational energy. This conserves energy, weight and manufacturing costs. Rotary engines also are known for their small size and high power to weight ratio.

Historically, rotary engines have been plagued by several problems. Leakage under pressure has been a problem with designs since Ramelli first invented the rotary pump. Later internal combustion designs all had overheating as a common design fault. In the 1970's, General Motors abandoned an ambitious rotary engine project due to strict new environmental regulations on vehicle emissions. Additionally, rotary engines have had gas mileage far below the industry standard and are notorious for needing major engine seal repairs.

Several improvements to the Wankel design have been implemented. One such improvement is the apex seal which serves to reduce friction and fuel loss through leakage under pressure. Significant problems with the design still exist:

(a) There are friction problems. Indeed all engines have friction problems. Rotary engine designs however, have considerable friction. In the Wankel design, the rotor must make three rotations inside the engine chamber for the drive shaft to rotate once. This 3:1 rotor to drive shaft ratio causes friction and heat problems.

(b) There is difficulty manufacturing the engine. To date only the Mazda RX-7 uses a rotary engine design. Other companies have constructed test engines, but have not mass-produced them.

(c) There is a waste problem with the fuel/air mixture leaking under pressure. In most designs, including the Wankel, a small amount of the fuel/air mixture used for combustion is lost during the engine rotation process. This is a design flaw. In the Wankel design's case, as the rotor rotates, there is also a point where some of the fuel/air mixture escapes via the exhaust port.

(d) There is difficulty in repairing the engine. Problems inside the rotor chamber are very difficult to get to.

SUMMARY OF THE CURRENT INVENTION

Accordingly, the previous disadvantages are remedied in our current invention. Several objectives and advantages of the invention are:

(a) to provide an engine with reduced engine friction;

(b) to provide an engine that is relatively easy to manufacture;

(c) to provide an engine that is comprised of few parts;

(d) to provide an engine that is smaller and more compact than existing designs;

(e) to provide an engine that conserves the fuel/air mixture.

Further objectives and advantages are to provide an engine that, because of the above listed objectives and advantages, will allow for superior gas mileage and performance.

DESCRIPTION OF THE PREFERRED EMBODIMENTS

Figure 1:
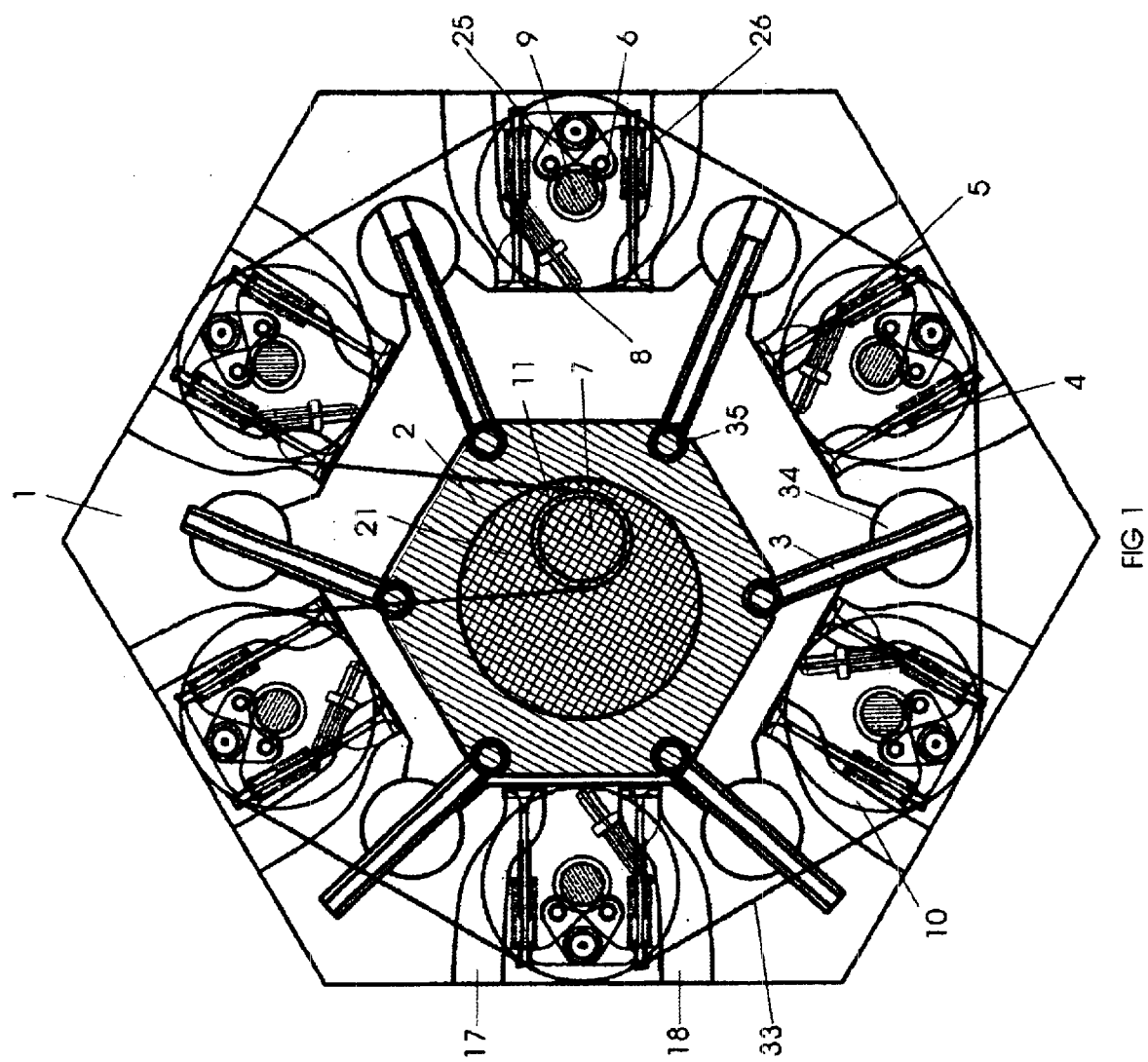
FIG. 1 shows an end view of an engine design with 6 chambers and incorporating an eccentric shaft. In this depiction, vanes are secured to the rotor with vane pivots and supported by pivoting vane slots located in the housing. This version incorporates a timing belt/chain to activate the valves.
Figure 3:
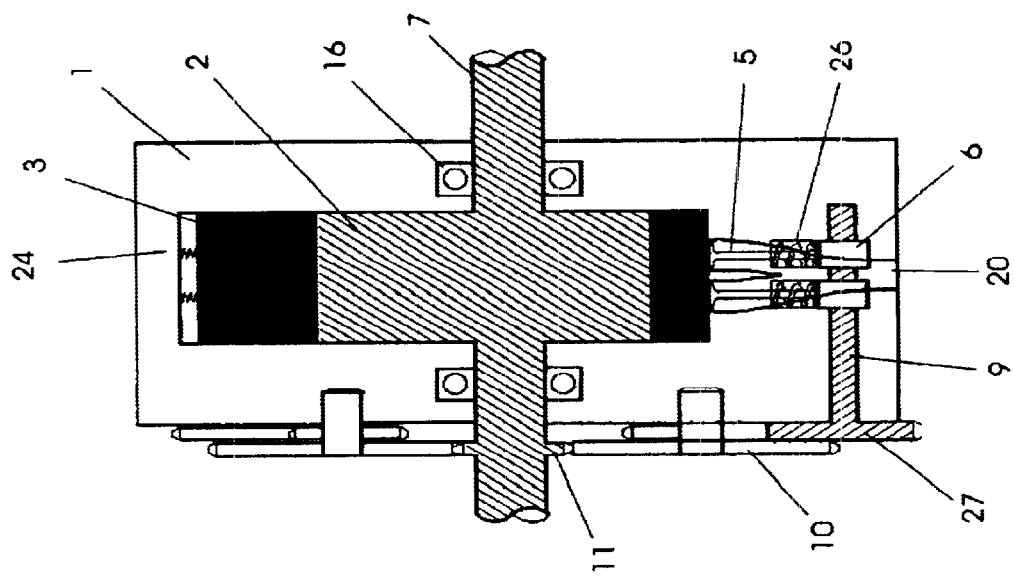
FIG. 3 shows a simplified side view of the same four-chamber style engine as in FIG. 2.
Figure 2:
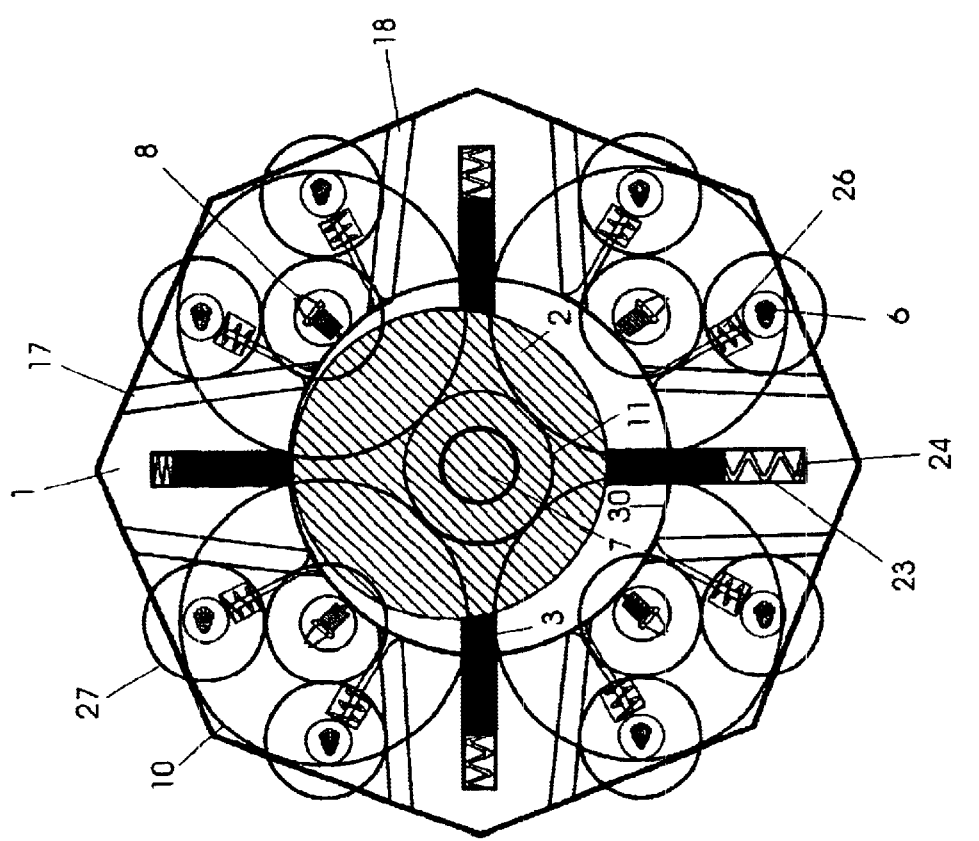
FIG. 2 shows an end view of another possible embodiment with an engine design with 4 chambers and a rotor attached directly to the drive shaft. Spring-loaded vanes are located in the housing. This version incorporates a stationary gear to manipulate the timing gears and activate the valves.
Figure 5:
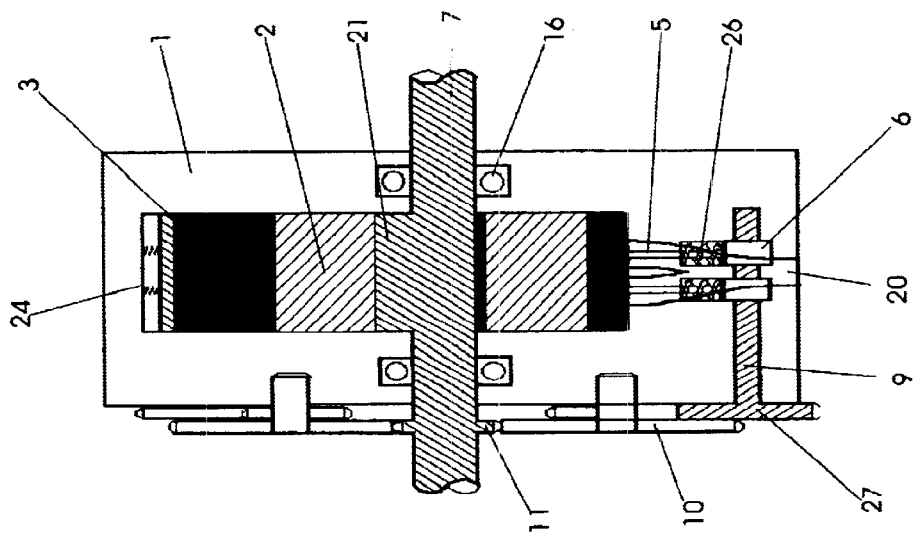
FIG. 5 shows a side view of the same four-chamber style engine as in FIG. 4.
Figure 4:
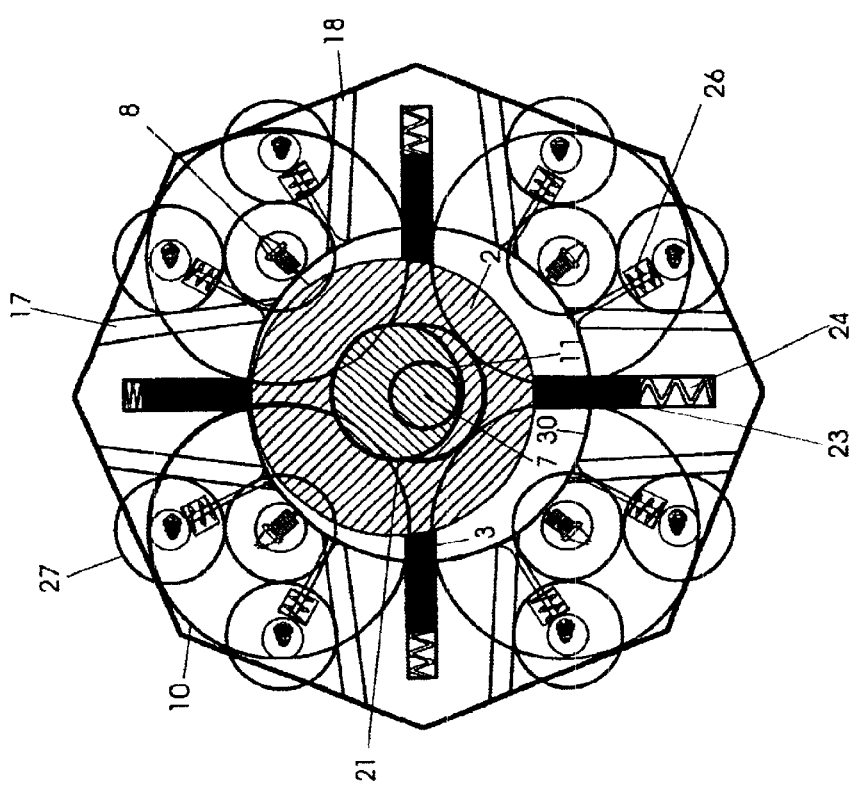
FIG. 4 shows an end view of a four-chamber engine design similar to FIG. 2, but with an eccentric shaft.

An internal combustion rotary engine consisting of housing (1) defining an oval or polygonal shaped chamber (30) encasing an oval shaped or polygonal shaped rotor (2) positioned off-center of drive shaft (7), allowing it to displace the fuel/air mixture. Vanes extending between rotor (2) and housing inner wall (30) create separate combustion chambers (23) within the engine and are supported on each end by either vane pivots (35) or pivoting vane slots (34) located either in rotor (2) or housing (1). Each separate combustion chamber (23) has its own capability to accomplish the four Otto cycles—intake, compression, combustion and exhaust—in a 720-degree rotation of rotor (2). Each combustion chamber (23) also has its own method for combustion (8) as well as a set of intake valves (4) and exhaust valves (5) which draw in and expel the fuel/air mixture, respectively.

An embodiment of the present invention is illustrated in FIG. 1.

The engine has housing (1), which in this case is a hexagon shape. Rotor (2), which in this case is also a hexagon shape, is contained inside housing (1). Vanes (3) extending between rotor (2) and housing inner chamber wall (30) create separate chamber rooms (23) within the engine and are supported on each end by either vane pivots (35) or pivoting vane slots (34) located either in rotor (2) or housing (1). Fuel/air mixture enters each engine chamber (23) through intake port (17), and intake valve (4). Valve spring (26) applies constant pressure on valve (4) to keep it closed. The motion of rotor (2) then compresses the fuel/air mixture and combusts it using sparkplug (8) Expended gas is then purged through exhaust valve (5) and exhaust port (18). Combustion causes rotor (2) to orbit the central axis of the inner chamber of housing (1). This motion is converted to rotational energy with eccentric shaft (21), causing drive shaft (7) to rotate as the action is repeated in another chamber.

For every two rotations of rotor (2), camshaft (9) rotates once. As camshaft (9) rotates, it moves cam (6), which in turn acts to manipulate rocker arm (25). It is this manipulation of rocker arm (25) which causes intake valves (4) and exhaust valves (5) to open and close in each combustion chamber (23).

The opening and closing of the aforementioned valves replenishes the fuel/air mixture inside each separate combustion chamber (23). In this embodiment, the fuel/air mixture travels through intake port (17) and then travels through intake valve (4) and is drawn into the air-tight chamber room (23) created by rotor (2), vanes (3), vane pivots (35), pivoting vane slots (34) and inner chamber wall (30). After combustion, the spent gas leaves the chamber through exhaust valve (5) into exhaust port (18). From there the spent gas exits the engine.

Instead of using gears in this process, other possible variations of this design include using belts, chains, or nuts to rotate camshaft (9).

Figure 8:
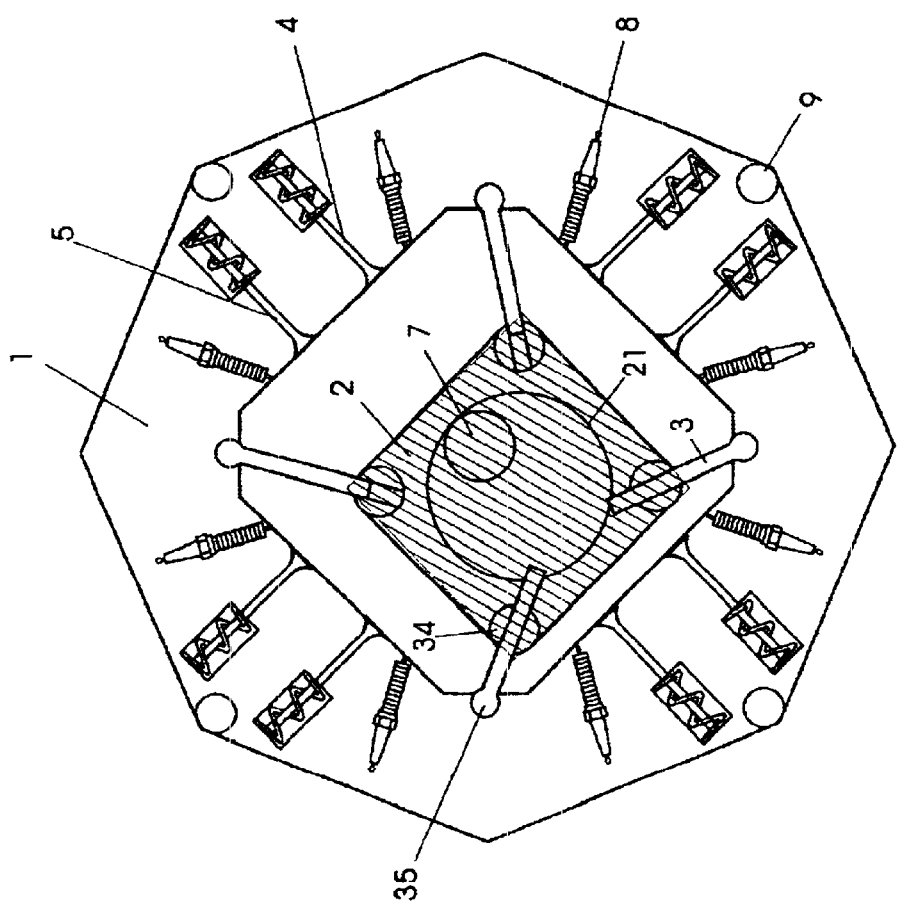
FIG. 8 shows an end view of an engine design with 4 chambers similar to FIG. 1, with an eccentric shaft. Vanes are secured to the engine casing by vane pivots and to the rotor by pivoting vane slots in this embodiment.

Vane pivots (35) attached to vanes (3) allow each vane (3) the mobility to slide freely in and out of pivoting vane slots (34) located in housing (1). FIG. 8 depicts a possible embodiment with vanes (3) attached to housing (1) by vane pivots (35) and sliding freely in and out of pivoting vane slots (34) located in rotor (2) in this case. It should be noted that vane pivots (35) and pivoting vane slots (34) may be located in either housing (1) or rotor (2).

In this embodiment, any number of two or more vanes (3) can be incorporated to allow for any number of two or more chamber rooms (23). Any number of two or more intake valves (4) and exhaust valves (5) may also be used. To reduce friction, a ball bearing (16) or similar system can easily be installed for the vanes (3). Furthermore, a crank and camshaft can accomplish the same vane (3) manipulation Given that the point where rotor (2) comes closest to the chamber wall in each combustion chamber represents 0 degrees, with spark plug (8) being located at 0 degrees, 180 degrees marks the point where rotor (2) is furthest from the inner wall of housing (1). From 0 degrees to 180 degrees, intake valve (4) is open. As intake valve (4) opens, the fuel air mixture enters the engine chamber.

From 180 degrees to 360 degrees, intake valve (4) is closed and no fuel air mixture enters combustion chamber (23). At this time, the fuel air mixture in the chamber is compressed as rotor (2) moves toward the combustion chamber wall. As rotor (2) nears a complete 360-degree cycle and the fuel air mixture is at its highest point of compression, spark plugs (8) ignite. This combustion causes a rapid increase in chamber pressure, causing rotor (2) to orbit the central axis of inner chamber. This process occurs from 360 degrees to 540 degrees. After this point, exhaust valve (5) opens, and the spent gas is purged through exhaust port (18). This purging process occurs from 540 degrees to 720 degrees, after which the four cycles repeat.

EXPLANATION OF FOUR ENGINE CYCLES:

Cycle one—Intake process 0–180 degrees

Cycle two—compression process 180–360 degrees=1 rotation

Cycle three—combustion process 360–540 degrees

Cycle four—purge process 540–720 degrees=2 rotations

This invention achieves the same results in two rotations as does a conventional four-stroke internal combustion engine.

Accordingly, the reader will see that the invention described here has numerous advantages over existing designs. It has the potential to be smaller and lighter while producing comparable power to existing designs. Additionally, the advantages described will allow for improved gas mileage and performance in that this invention is less susceptible to vibration problems, eliminates the need for balance weights, has reduced engine friction, is easy to manufacture, solves existing rotary engine fuel/air mixture waste problems and is easy to maintain and repair because of its simplicity.

Although the description above contains many specifics, these should not be construed as limiting the scope of the invention but as merely providing illustrations of some of the presently preferred embodiments of the engine. For example, the engine can have any number of valves per chamber, a different shaped rotor, an inner-casing which does not have flat surfaces (such as slightly concave), etc.

Thus the scope of the invention should be determined by the appended claims and their legal equivalents, rather than by the examples given.

NCRE PART LIST

| | |
|---|---|
| 1. | Housing |
| 2. | Rotor |
| 3. | Vane |
| 4. | Intake valve |
| 5. | Exhaust valve |
| 6. | Cam |
| 7. | Driveshaft |

-continued

NCRE PART LIST

Figure 7:
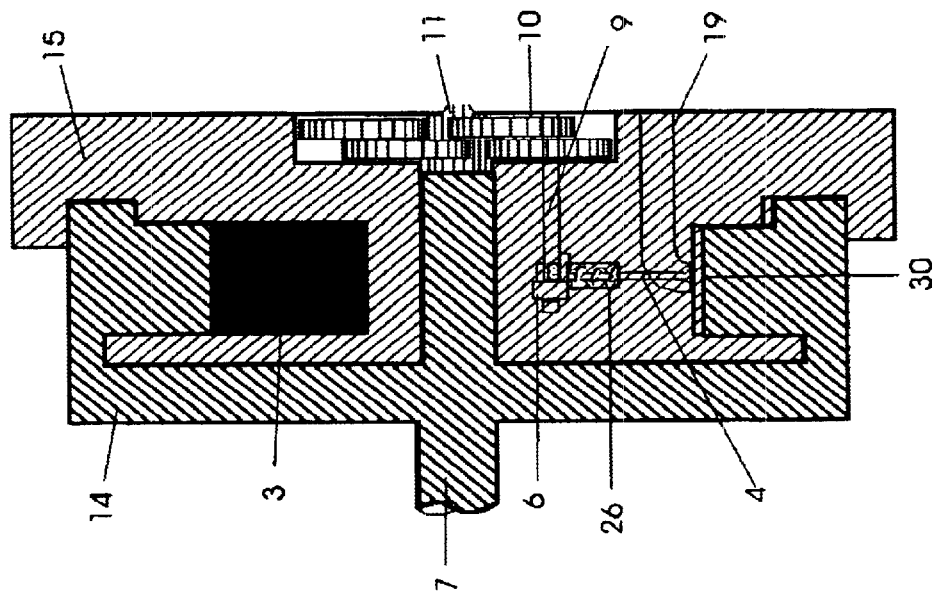
FIG. 7 shows a side view of FIG. 6.
Figure 6:
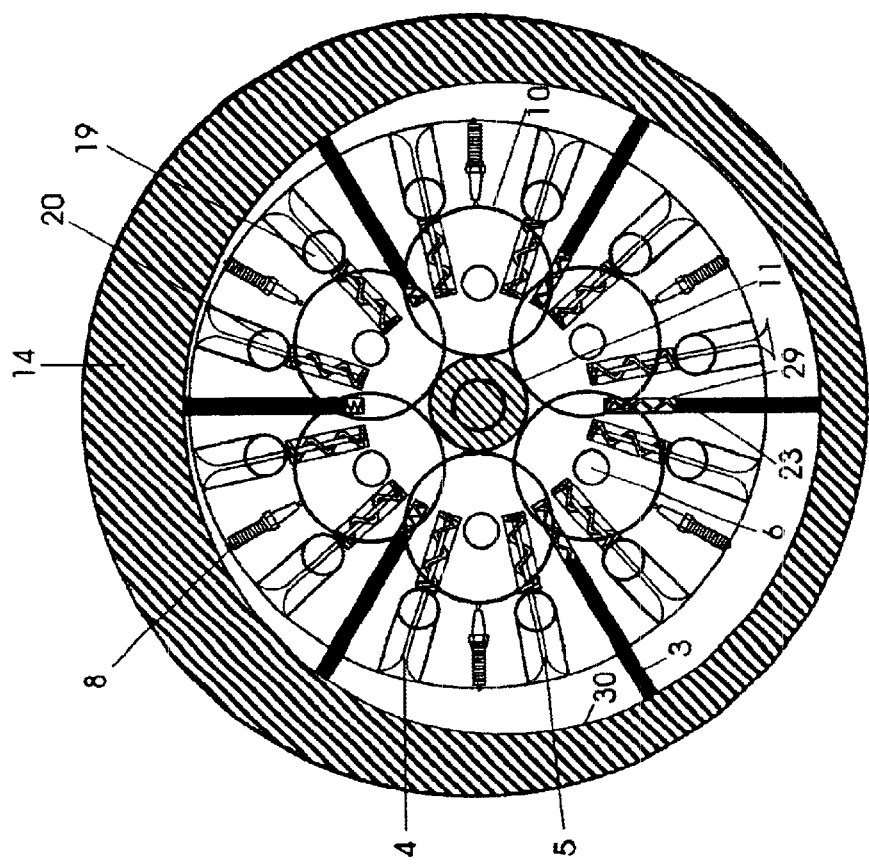
FIG. 6 shows an end view of a variation of the design with sparkplugs and ports contained within the rotor. The rotor in this case is stationary, and the outer housing rotates.

| | |
|---|---|
| 8. | Spark plug or injector |
| 9. | Cam shaft |
| 10. | Timing gear |
| 11. | Stationary gear |
| 12. | Side casing Unused |
| 13. | Unused |
| 14. | Housing (FIGS. 6&7) |
| 15. | Piston (FIGS. 6&7) |
| 16. | Shaft support bearings |
| 17. | Intake port |
| 18. | Exhaust port |
| 19. | Intake port |
| 20. | Exhaust port |
| 21. | Eccentric shaft |
| 22. | Timing belt |
| 23. | Vane hole |
| 24. | Vane spring |
| 25. | Rocker arm |
| 26. | Valve spring |
| 27. | Cam timing gear |
| 28. | Stationary gear shaft |
| 29. | vane spring |
| 30. | Housing inner wall |
| 31. | Spring loaded vane |
| 32. | Unused |
| 33. | Timing belt or chain |
| 34. | Pivoting vane slot |
| 35. | Vane pivot |

What is claimed is:

1. A rotary internal combustion engine comprising:

a housing means defining a chamber having an oval or polygonal shaped intenor surface and ends and a central axis passing there-through, driveshaft means rotationally mounted in the housing means, an oval or polygonal shaped rotor positioned off-center of tie central chamber axis, an eccentric member secured to said driveshaft means for converting orbit motion of said rotor into shaft rotational energy, means for securing said rotor in an orbit pattern using a gearing system or one or more additional eccentric shafts, two or more vanes disposed about said rotor creating two or more separate combustion chambers within the engine, pivoting vane slots located in said rotor or said housing and in sliding contact with said vanes, vane pivots located either in said rotor or said housing and permitting vane radial motion, vane holes located either in said rotor or said housing and permitting vane pivot mobility, said vanes being arranged around said rotor to make said combustion chambers separate from each other within said housing chamber via said pivoting vane slots and said vane pivots, said rotor having surfaces in each said combustion chamber and movable in all four Otto cycles relative to each said combustion chamber, intake and exhaust valve means for each said combustion chamber mounted on the housing means for controlling the flow of said air and fuel mixture into and out of said combustion chambers, said vanes being located between each set of intake and exhaust valve means, said intake and exhaust valve means having at least one intake and exhaust valve set in communication with each said combustion chamber, means for providing a combustible air and fuel mixture to each said combustion chamber, means for operating said intake and exhaust valves in timed relation with the orbit motion of said rotor to allow said air and fuel mixture to flow into each said combustion chamber and allow exhaust gases to flow out of each said combustion chamber, a fuel ignition means in communication with each said combustion chamber operable to ignite the fuel in said combustion chamber to thereby cause said rotor to have orbital movement and rotate the driveshaft.

2. A rotary internal combustion engine comprising:

a housing means defining a cylindrical chamber having an interior surface and ends and a central chamber axis passing there-through, a driveshaft disposed within the chamber and having a longitudinal driveshaft axis parallel to the chamber axis, wherein the driveshaft axis is disposed a non-zero distance from the chamber axis, a cylindrical rotor being rotationally disposed about the driveshaft and positioned off-center of the driveshaft and central chamber axis, means for securing said rotor in a rotational pattern using a gearing system or one or more eccentric shafts, two or more vanes disposed about the housing in sliding contact with the exterior surface of the rotor, said vanes being arranged around said housing or said rotor to provide separate combustion chambers within said housing chamber, intake and exhaust valve means for each combustion chamber mounted on the housing for controlling the flow of said air and fuel mixture into and out of said combustion chambers, said vanes being located between each said set of intake and exhaust valve means, said intake and exhaust valve means having at least one intake and exhaust valve set in communication with each said combustion chamber, means for providing a combustible air and fuel mixture to each said combustion chamber, means for operating said intake and exhaust valves in timed relation with the rotational motion of said rotor to allow said air and fuel mixture to flow into each said combustion chamber and allow exhaust gases to flow out of each said combustion chamber, a fuel ignition means in communication with each said combustion chamber operable to ignite the fuel in said combustion chamber to thereby cause said rotor to have rotational movement and rotate the driveshaft.

3. A rotary internal combustion engine comprising:

a housing means defining a cylindrical chamber having an interior surface and ends and a central chamber axis passing there-through, a drive rotationally mounted on the housing means, a cylindrical rotor being rotationally disposed about the chamber axis and positioned off-center of the driveshaft and central chamber axis, an eccentric member secured to said driveshaft means for converting rotational motion of said rotor into shaft rotational energy, means for securing said rotor in a rotational pattern using a gearing system or one or more eccentric shafts, two or more vanes disposed about the housing in sliding contact with the exterior surface of the rotor, said vanes being arranged around said housing to make said combustion chambers separate from each other within said housing chamber, intake and exhaust valve means for each said combustion chamber mounted on the housing for controlling the flow of said air and fuel mixture into and out of said combustion chambers, said vanes being located between each said set of intake and exhaust valve means, said intake and exhaust valve means having at least one intake and exhaust valve set in communication with each said combustion chamber, means for providing a combustible air and fuel mixture to each said combustion chamber, means for operating said intake and exhaust valves in timed relation with the rotational motion of said rotor to allow said air and fuel mixture to flow into each said combustion chamber and allow exhaust gases to flow out of each said combustion chamber, a fuel ignition means in communication with each said combustion chamber operable to ignite the fuel in said combustion chamber to thereby cause said rotor to have rotational movement and rotate the driveshaft.

4. A rotary engine, comprising:

a housing means defining a cylindrical chamber having an interior surface and ends and a central chamber axis passing there-through, a driveshaft secured to said housing, a cylindrical shaped stationary piston disposed within the chamber and having a longitudinal axis parallel to the chamber axis, wherein the stationary piston axis is disposed a non-zero distance from the chamber axis, two or more vanes disposed within the piston, each vane in slideable contact with the interior surface of the chamber, said vanes being arranged around said stationary piston to provide separate combustion chambers within said housing chamber, at least one intake valve disposed in said piston in fluid communication with an intake port defined in an end of the housing to permit a fuel/air mixture to enter each said combustion chamber, said intake valve serving to regulate the amount of fuel/air mixture which may enter each said combustion chamber, at least one exhaust valve disposed in said piston in fluid communication with an exhaust port defined in an end of the chamber to permit exhaust gas to exit each said combustion chamber, said exhaust valve serving to regulate the amount of fuel/air mixture which may exit each said combustion chamber, said vanes being located between each set of intake and exhaust valve means, said intake and exhaust valve means having at least one intake and exhaust valve set in communication with each said combustion chamber, means for providing a combustible air and fuel mixture to each said combustion chamber, means for operating said intake and exhaust valves in timed relation with the rotational motion of said housing to allow said air and fuel mixture to flow into each said combustion chamber and allow exhaust gases to flow out of each said combustion chamber, a fuel ignition means in communication with each said combustion chamber operable to ignite the fuel in said combustion chamber to thereby cause said housing to have rotational movement and rotate the drive shaft.

5. The engine of claim 4 wherein exists:

at least one said intake valve defied in an end of said housing in fluid communication with at least one said intake port defined in an end of said housing to permit a fuel/air mixture to enter each said combustion chamber, said intake valve serving to regulate the amount of fuel/air mixture which may enter each said combustion chamber.

6. The engine of claim 4 wherein exists:

at least one said exhaust valve defined in an end of said housing in fluid communication with at least one said exhaust port defined in an end of said housing to permit a fuel/air mixture to exit each said combustion chamber, said exhaust valve serving to regulate the amount of fuel/air mixture which may exit each said combustion chamber.

7. The engine of claim 4 wherein exists:

at least one said exhaust valve defined in the side of said housing in fluid communication with at least one said exhaust port defined in the side of said housing to permit a fuel/air mixture to exit each said combustion chamber, said exhaust valve serving to regulate the amount of fuel/air mixture which may exit each said combustion chamber.

* * * * *